(12) United States Patent
Polan

(10) Patent No.: US 7,693,931 B2
(45) Date of Patent: Apr. 6, 2010

(54) SYSTEM AND METHOD FOR GRID COMPUTING

(75) Inventor: Michael G. Polan, Markham (CA)

(73) Assignee: International Business Machines Corporation, Armonk, NY (US)

(*) Notice: Subject to any disclaimer, the term of this patent is extended or adjusted under 35 U.S.C. 154(b) by 1131 days.

(21) Appl. No.: 10/821,082

(22) Filed: Apr. 8, 2004

(65) Prior Publication Data
US 2005/0081083 A1 Apr. 14, 2005

(30) Foreign Application Priority Data
Oct. 10, 2003 (CA) .................................... 2444835

(51) Int. Cl.
G06F 15/16 (2006.01)
(52) U.S. Cl. ................................. 709/201; 714/2; 714/6
(58) Field of Classification Search ................ 709/201, 709/221; 714/2, 3, 4, 6
See application file for complete search history.

(56) References Cited

U.S. PATENT DOCUMENTS

| 6,122,753 A | 9/2000 | Masuo et al. ................ 714/4 |
| 6,460,144 B1 | 10/2002 | Ashcroft et al. ............. 714/4 |
| 7,054,910 B1 * | 5/2006 | Nordin et al. ............... 709/208 |
| 2002/0038301 A1 * | 3/2002 | Aridor et al. ................ 707/10 |
| 2003/0005068 A1 | 1/2003 | Nickel et al. |
| 2003/0237084 A1 * | 12/2003 | Neiman et al. .............. 718/102 |
| 2004/0098447 A1 * | 5/2004 | Verbeke et al. .............. 709/201 |
| 2005/0050382 A1 * | 3/2005 | Beeston et al. ............... 714/6 |

FOREIGN PATENT DOCUMENTS

| EP | 1246123 A2 * | 3/2002 |
| JP | 200083038 A | 6/1999 |
| JP | 2001326665 A | 5/2000 |

OTHER PUBLICATIONS

David P. Anderson, et al., SETI@Home documentation From Communications of the ACM. Nov. 2002, pp. 56-61. http://portal.acm.org/citation.cfm?id=581571.581573.*
Ho, Dac Phuong et al. Solving the N-Body Problem with the ALICE Grid System. Dec. 2002. http://www.comp.nus.edu.sg/~teoym/pub/02/acs02.pdf.*

* cited by examiner

Primary Examiner—John Follansbee
Assistant Examiner—Joseph L Greene
(74) Attorney, Agent, or Firm—Patents on Demand, P.A.; Scott M. Garrett

(57) ABSTRACT

A method and system for grid computing. In an embodiment, a plurality of client machines are interconnected to at least one master machine. The master machine assigns a portion of a computing task to each one of the client machines. If any given client machine fails, or is delayed, in the performance its portion of the task, the master machine uses an estimate of that particular portion when presenting output for the task.

17 Claims, 7 Drawing Sheets

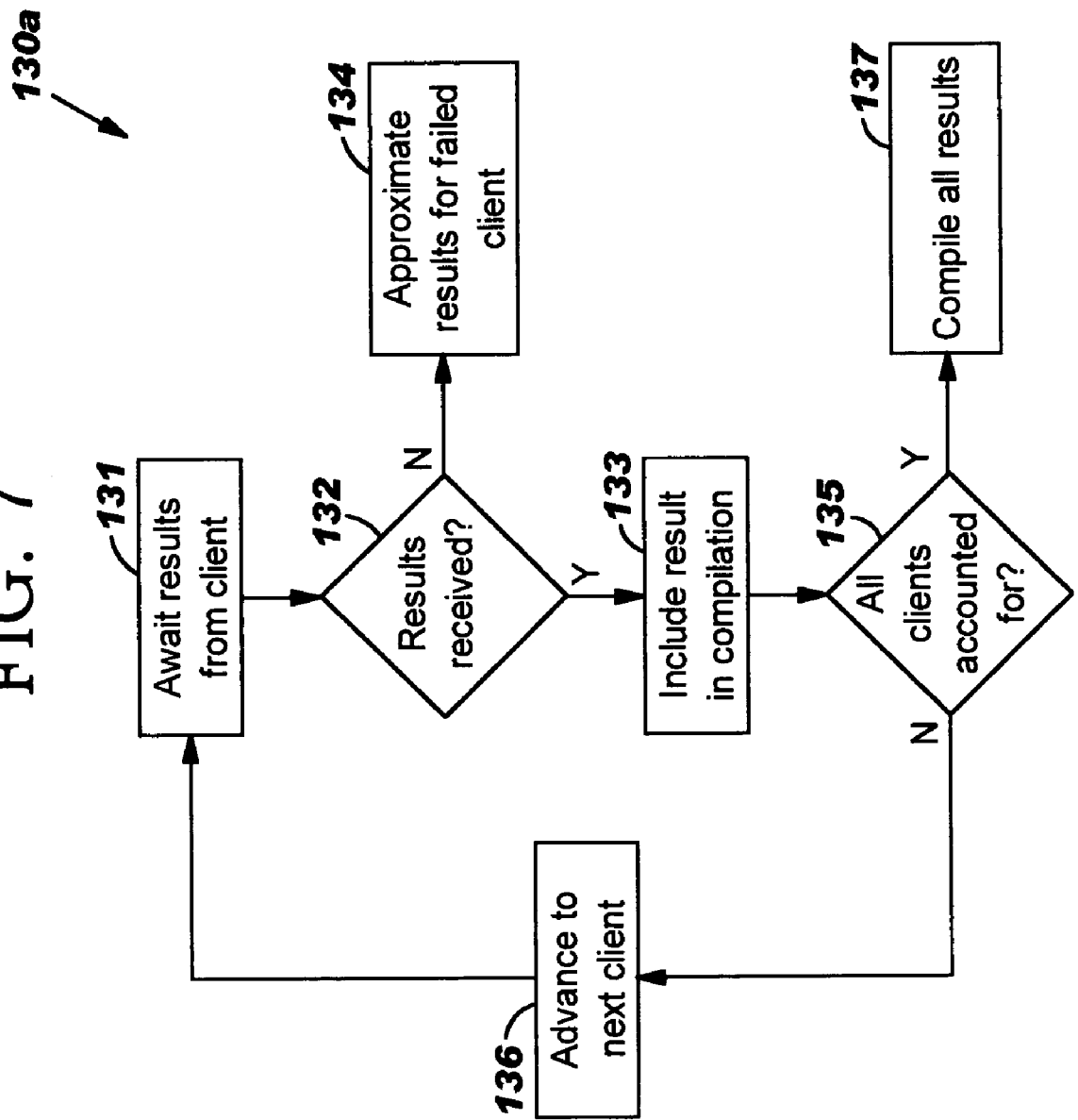

SYSTEM AND METHOD FOR GRID COMPUTING

FIELD OF THE INVENTION

The present invention relates to generally to computing and more particularly to a method and system for grid computing.

BACKGROUND

The interconnection of relatively inexpensive microcomputers via networks, such as the Internet, presents opportunities to provide computing power that can rival very costly supercomputers. Known as grid computing, the harnessing of such computing power typically involves a master computer that assigns portions of a computing task to a plurality of discrete client computers via a network.

One of the more well-known grid computing applications is the SETI@home project (http://setiathome.ssl.berkeley.edu) sponsored by the Search for Extraterrestrial Intelligence with support from The Planetary Society, 65 North Catalina Avenue, Pasadena, Calif. 91106-2301 USA (http://www.planetary.org). SETI@home is a computing effort that utilizes immense amounts of computing power. In a nutshell, each client in the grid analyzes a small portion of a huge volume of radio telescope data, to mine for extraterrestrial radio communications or other evidence of extraterrestrial life. The radio telescope data is, by-and-large, simply radio-frequency background noise generated by the universe, and therefore the task of discerning an extraterrestrial broadcast within that data is an enormous undertaking. The undertaking is perceived to have low odds of success and little obvious commercial value, thereby making the use of a supercomputer to perform this task cost prohibitive. The SETI@home project is thus perceived to be an ideal task for grid computing. To participate, individuals with personal computers connected to the Internet go to the SETI Web site and download a special screensaver. The screensaver volunteers the individual computer to be a client in a grid of thousands of client computers. SETI's system assigns portions of the data to be processed by each individual client computer.

SETI@home is, however, but one example of the potential for grid computing. In general, grid computing can offer computing power to individuals and institutions that would not otherwise have access to supercomputers.

One difficulty common to grid computing is the management of each client machine. Numerous problems can arise when trying to manage any particular computing task, problems that are exacerbated as more and more machines participate in the task. For example, in the SETI@home project, each client machine is typically owned and operated by individuals, who may at any given time choose to "drop out" of participating in the grid computing application. Even where those individuals themselves choose to remain, problems with any individual client, or network problems between the manager and client, will frustrate the performance of the larger computing task. The manager must thus keep track of the performance of each client and accommodate failures in order to properly complete the task.

It is expected that certain problems of grid computing can be overcome with the Open Grid Services Architecture ("OGSA"), which promises to provide a common standard that will make the implementation of software applications via grid computing relatively straightforward. Thus, manager and client machines that are OGSA compliant will at least be able to use the OGSA layer to handle, in a standardized fashion, at least some of the connectivity issues between the manager and the clients.

However, even with the OGSA, problems remain. Each client in a grid is inherently unreliable, either due to client or network failure, making performance of the task less reliable than simply running the task on a supercomputer. Problems are further exacerbated by the fact that there can be a delay before the master detects the failure of any given client. Still further problems arise upon detection of the failure of a particular client, as it may be necessary to restart the entire task if that failed client happened to be performing some critical portion of the task.

SUMMARY

It is an object of the present invention to provide a method and system for grid computing that obviates or mitigates at least one of the above-identified disadvantages of the prior art.

In an aspect of the present invention there is provided a manager for use in a system of grid computing. The manager can be a computing device, such as a server, that comprises a processor that is programmed to render the manager operable to define a computing task based on data received by the processor. The processor is further operable to assign a portion of the task to each of a plurality of clients that are connected to the manager via a network. The processor is also operable to approximate a result of each portion of the task if the client fails to return its result to the manager.

The task can be one of plurality of repeatable operations, that themselves include a plurality of sub-operations, and wherein an approximation of the sub-operation introduces a predefined accepted level of error to a performance of the task. Typically, the sub-operations can be applied substantially independently of the other sub-operations. The task can be an n-body type problem, such as the type that is solvable using the Barnes-Hut operation.

Another aspect of the invention provides a method of grid computing comprising the steps of:
  receiving data respective to a computing task;
  defining the task based on the received data;
  assigning a portion of the task to each of a plurality of clients based on the defining step;
  awaiting receipt of results of the portions from the clients;
  approximating the results for any clients where the results are not received;
  compiling the received results and the approximated results; and, outputting the results in a pre-defined format.

Another aspect of the invention provides a system of grid computing comprising a manager operable to define a computing task and assign a portion of the task to each of a plurality of clients that are connected to the manager via a network. The manager is further operable to approximate a result of the portion if the client fails to return the result to the manager.

Another aspect of the invention comprises a computer-readable medium comprising a plurality of computing instructions for a manager that is connectable to a plurality of clients via a network. The computing instructions are for defining a computing task and assigning a portion of the task to each of the clients. The instructions include steps for approximating a result of the portion of the task, if the client fails to return the result to the manager.

BRIEF DESCRIPTION OF THE DRAWINGS

The present invention will now be explained, by way of example only, with reference to certain embodiments and the attached Figures.

FIG. 7 is a flow-chart depicting a method of sub-steps for performing one of the steps in the method of FIG. 3.

DETAILED DESCRIPTION

Figure 1:
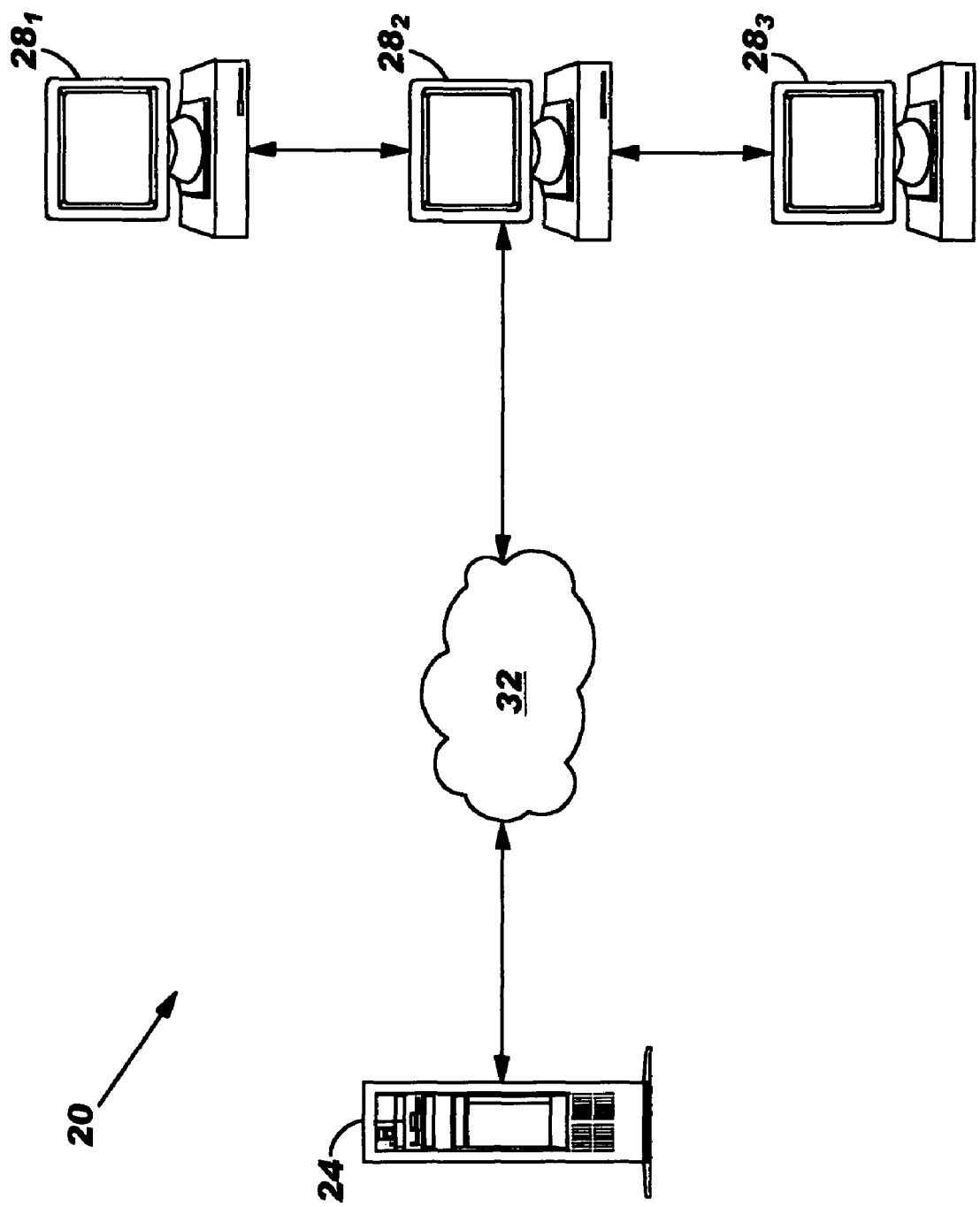
FIG. 1 is a schematic representation of a system for grid computing in accordance with an embodiment of the invention.

Referring now to FIG. 1, a system for grid computing is indicated generally at 20. System 20 includes a master 24 connected to a plurality of clients $28_1$, $28_2$ ... $28_n$ (collectively "clients 28" and generically "client 28"). Master 24 and clients 28 are connected via a network 32 such as the Internet, but network 32 can be another type of network as desired. Master 24 can be any type of computing device operable to manage a grid computing task, such as an IBM® Pseries running Linux®. Clients 28 are typically a diverse range of relatively low-power personal computing devices, such as any Intel®-based personal computers using the Pentium® chipset, or iMacs® from Apple® respectively running a suitable operating system. In a present embodiment, software executing on master 24 and clients 28 is OGSA compliant to handle connectivity via network 32.

Figure 2:
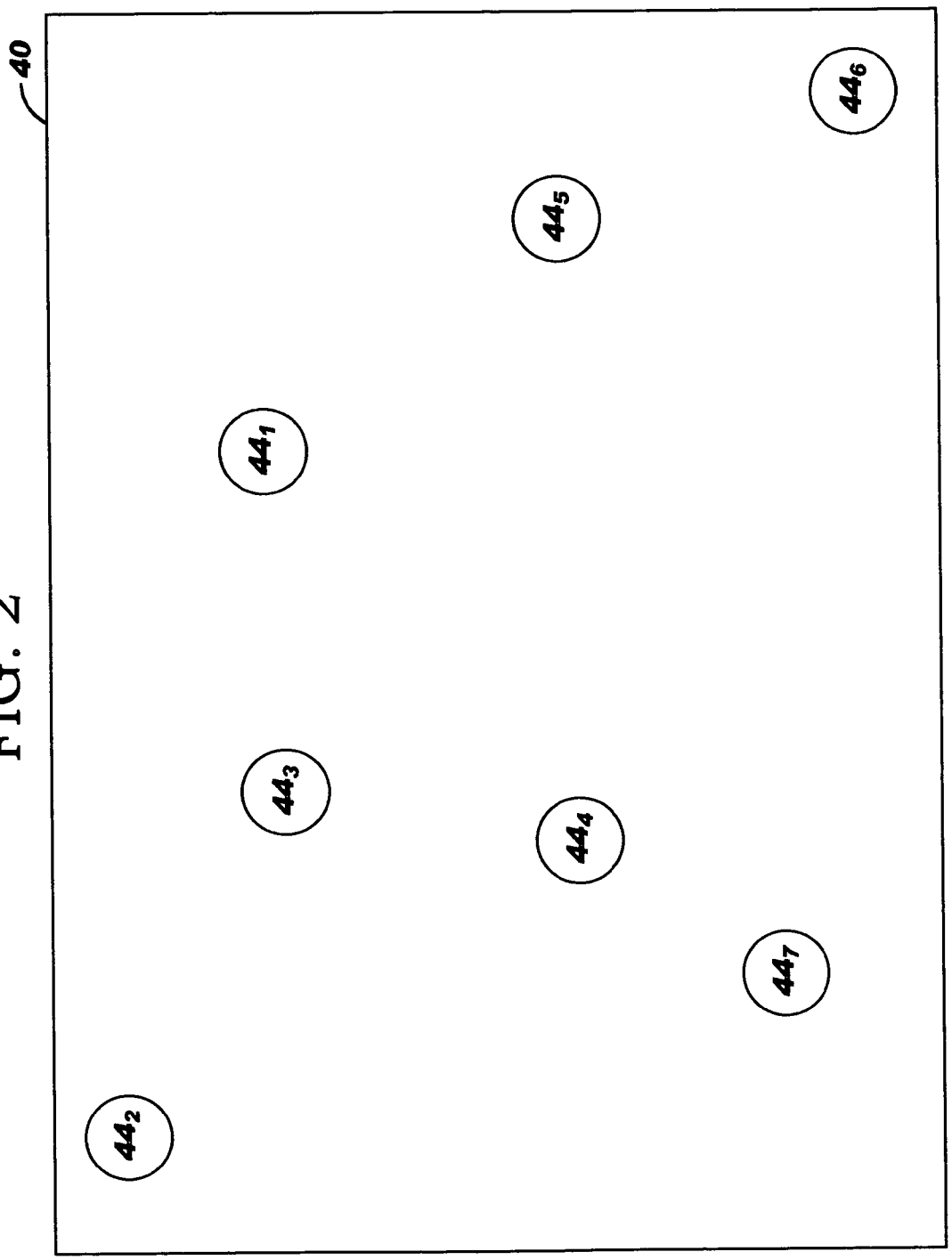
FIG. 2 is a representation of a plurality of stars within a galaxy for which movements of those stars is to be determined.

Before describing system 20 and its operation further, an example of a computing task that can be performed on system 20 will now be described. Referring now to FIG. 2, a galaxy 40 is indicated. Galaxy 40 is comprised of a plurality of stars $44_1$, $44_2$ ... $44_7$ (collectively "stars 44" and generically "star 44"). For each star 44, its mass and the coordinates of its location within galaxy 44 is known. System 20 is operable to perform the computing task of determining the movement of stars 44 over time. Those of skill in the art will now recognize that this exemplary task is a simplified "n-body" type problem, with the common task of determining the distances (denoted herein with the variable "r") between each one of the stars 44. It will also thus become apparent to those of skill in the art that system 20 can be used to perform other types of, and far more complex and/or multi-dimensional, n-body problems.

Figure 3:
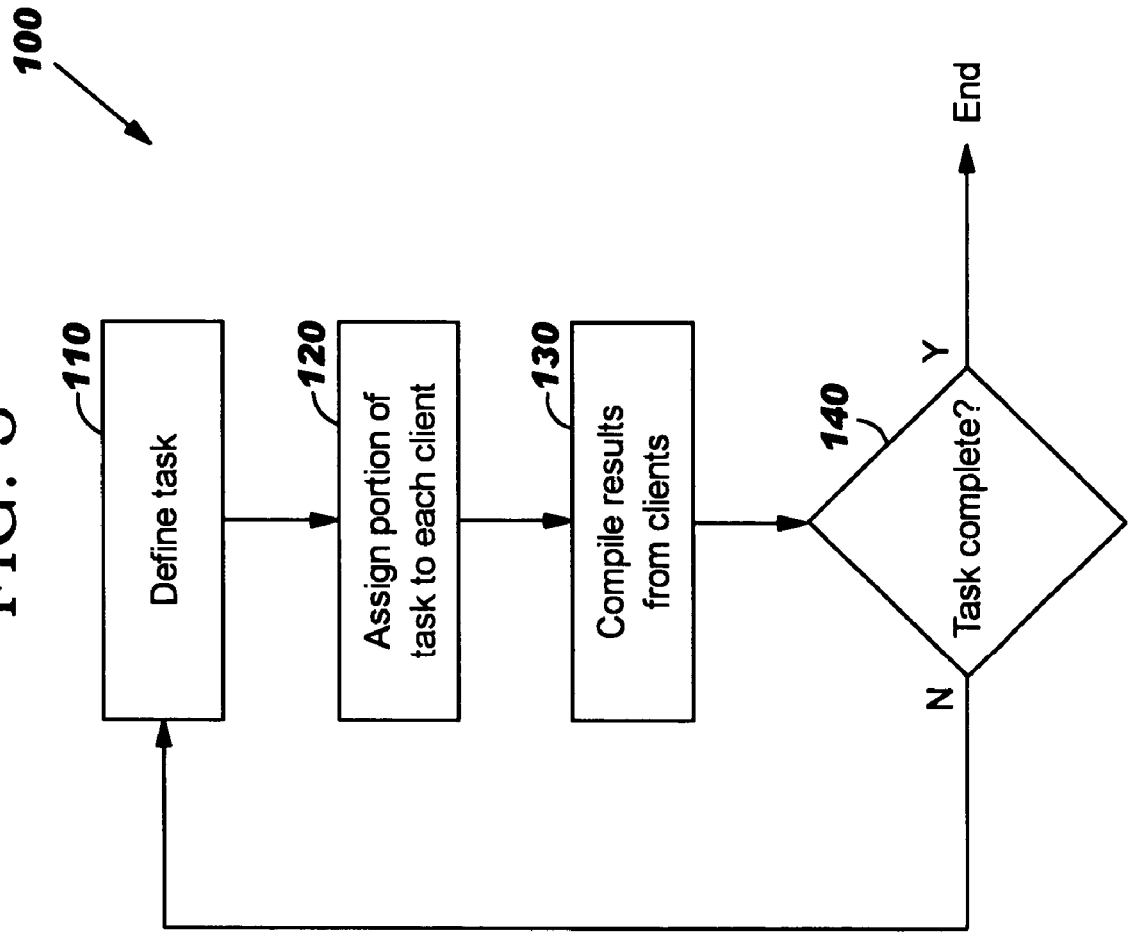
FIG. 3 is a flow-chart depicting a method of grid computing in accordance with another embodiment of the invention.

FIG. 3 shows a method of grid computing in accordance with another embodiment of the invention that is indicated generally at 100. In particular, method 100 depicts a set of steps for operating system 20 that can be used to perform the task of determining the movement of stars 44. It is contemplated that the following discussion of method 100 will assist in the understanding of system 20, and vice-versa. However, those of skill in the art will recognize that the operation and sequence of steps of method 100 can be varied, and need not actually be implemented on a system identical to system 20, and that such variations are within the scope of the invention.

Beginning at step 110, a task is defined. When implemented on system 20, manager 24 performs step 110. Continuing with the example of determining the movement of stars 44 in galaxy 40, manager 24 will perform step 110 by building a tree that divides this task into smaller portions. In the present embodiment, manager 24 will thus analyze the data associated with galaxy 40 and build a tree using the well-known Barnes-Hut operation to recursively subdivide galaxy 40 in order to simplify determination of distances between stars 44, and thereby to determine their accelerations and movements over time. For a detailed discussion of the Barnes-Hut operation, see Josh Barnes and Piet Hut, *A Hierarchical O(N log N) Force Calculation Algorithm*, Nature, 324, 4 December 1986.

Figure 4:
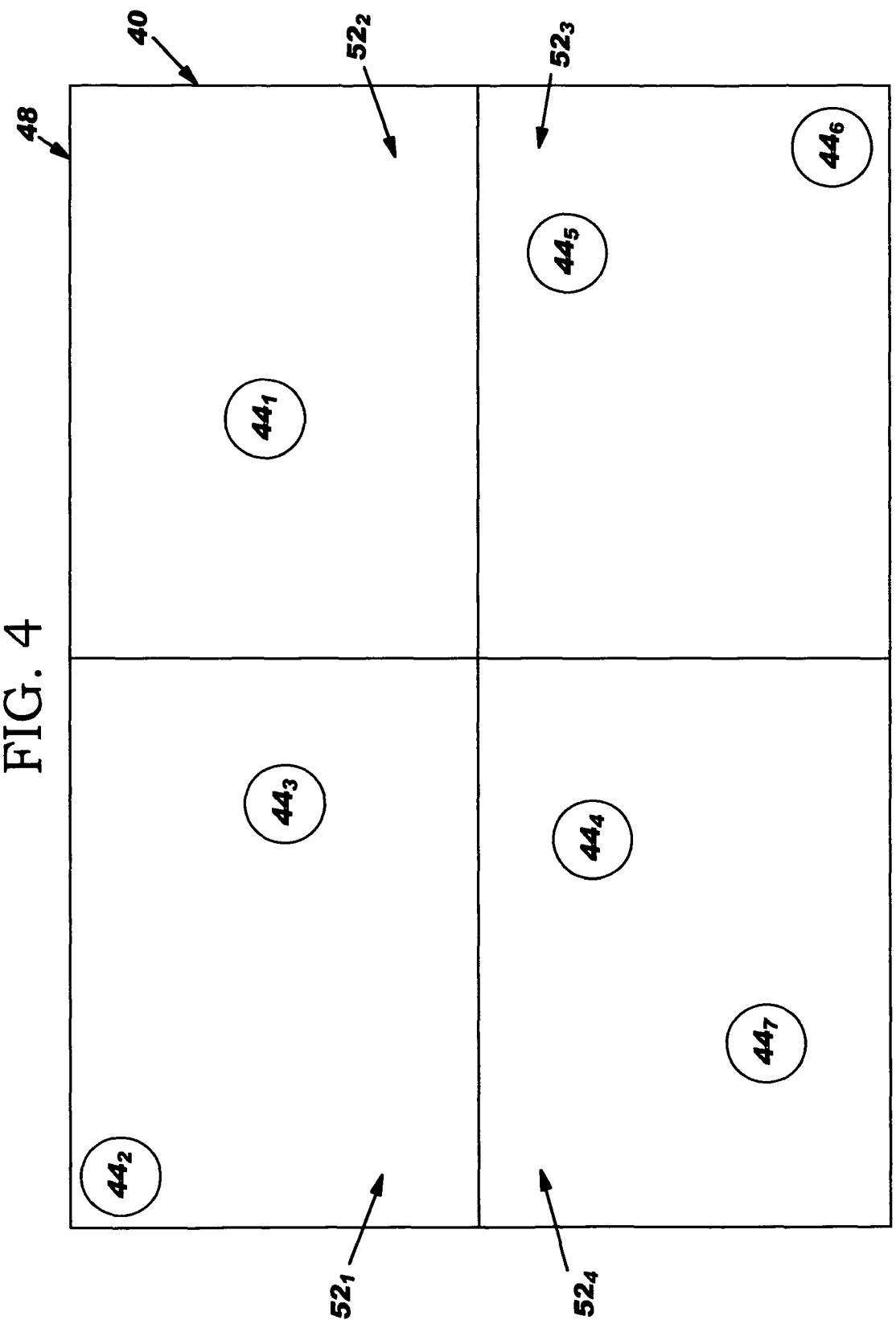
FIG. 4 shows the galaxy of FIG. 2 being sub-divided using the method of FIG. 3.

Referring now to FIG. 4, galaxy 40 is shown having been divided into a square 48 whose sides are of equal length. The length of the sides is the maximum spatial extent (denoted herein with the variable "E") of stars 44 in any spatial dimension. Using Barnes-Hut, galaxy 40 is thus defined by square 48 whose side is the maximum extent between the stars 44 therein, namely between star $44_2$ and star $44_6$. The square is divided into four quadrants $52_1$, $52_2$, $52_3$ and $52_4$.

Figure 5:
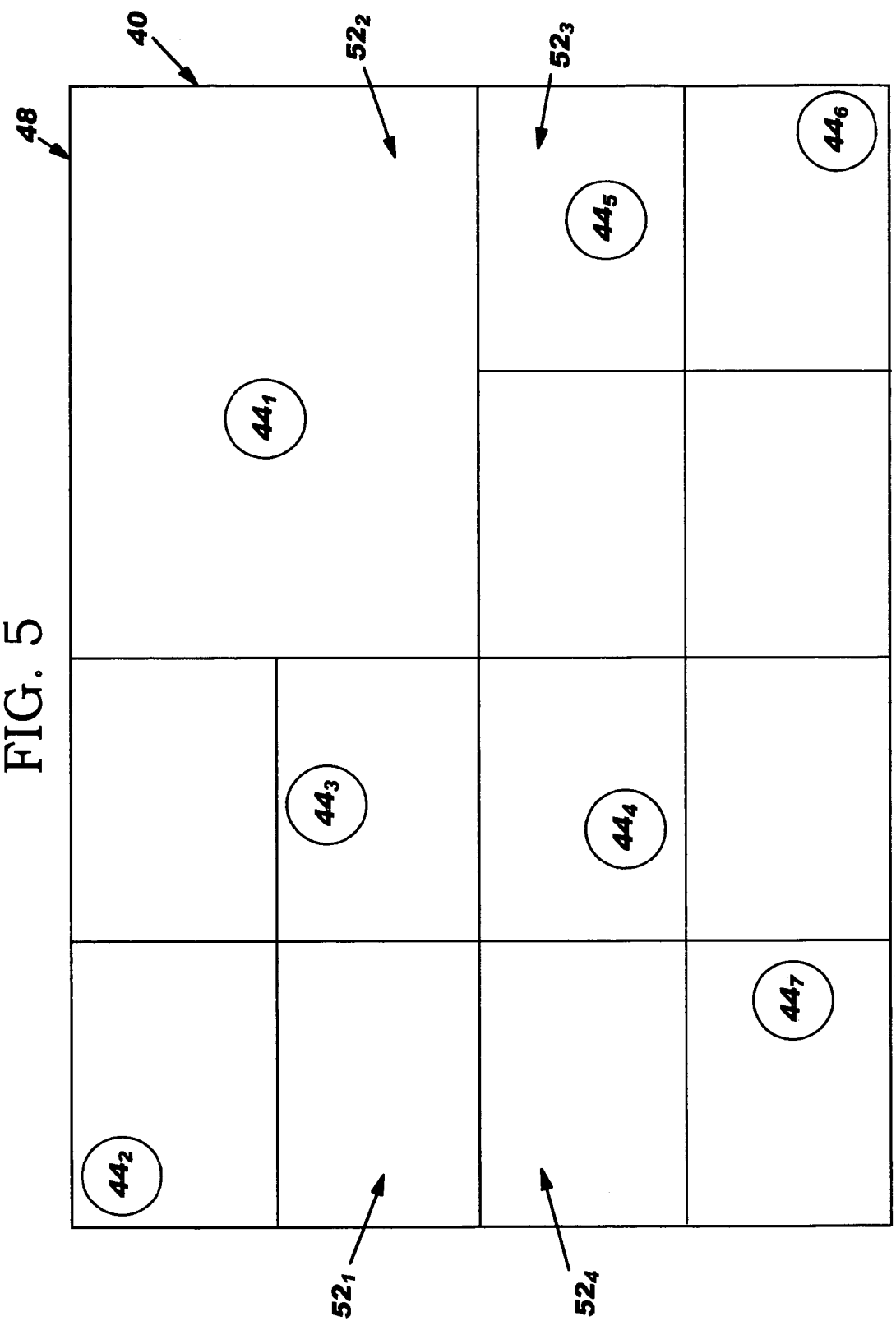
FIG. 5 shows the galaxy of FIG. 4 being further sub-divided using the method of FIG. 3.

As shown in FIG. 5, galaxy 40 is then sub-divided recursively using the Barnes-Hut approach to evenly divide galaxy 40 and quadrants 52 thereof until there is one or no star 44 within a given sub-division. For example, since quadrant $52_2$ only contains one star $44_1$ it need not be subdivided.

Figure 6:
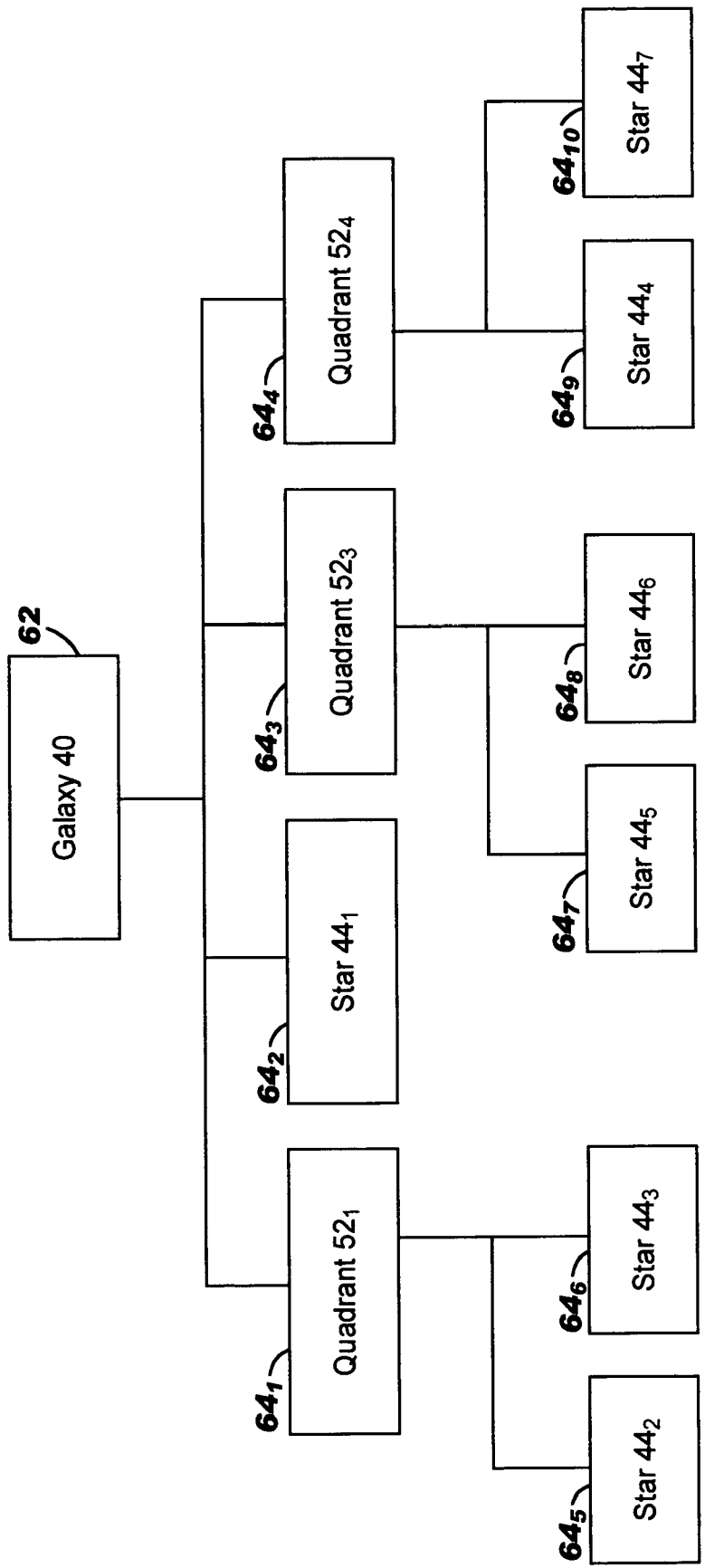
FIG. 6 shows a tree representative of the sub-division of the galaxy of FIG. 5 that is prepared using the method FIG. 3.

As shown in FIG. 6, the results of the subdividing shown in FIGS. 4 and 5 are then assembled into a tree 60 in accordance with the Barnes-Hut operation. The root of tree 60 is indicated at 62, and represents the entire galaxy 40. Tree 60 has a plurality of leaves 64, which respectively represent a quadrant 52 or a star 44, depending on whether a subdivision was performed or not on a particular region of galaxy 40. Thus, leaf $64_2$ represents star $44_1$, while leaves $64_1$, $64_3$, $64_4$ represent quadrants $52_1$, $52_3$ and $52_4$ respectively. By the same token, leaves $64_5$, $64_6$, ... $64_{10}$ represent stars $44_2$, $44_3$, $44_5$, $44_6$, $44_4$ and $44_7$ respectively. The contents of each of those leaves 64 will thus include information relevant to its respective star 44, i.e. its mass, precise location within galaxy 40, and any other information that is desired, such as an initial acceleration and velocity.

Thus, the building of tree 60 by manager 24 from the data representing galaxy 40 represents the culmination of the performance of step 110 in method 100.

Method 100 then advances from step 110 to step 120, at which point a portion of the computing task is assigned to each client within the grid. When implemented on system 20, manager 24 performs step 120. Continuing with the example of determining movement of stars 44, manager 24 will thus take tree 60 and assign portions of tree 60 to various clients 28 within system 20 according to the distribution of stars 44 in tree 60. For example, manager 24 can assign:

a) a first portion to client $28_1$, namely stars $44_2$, $44_3$ and $44_1$ to according to the contents of leaves $64_5$, $64_6$ and $64_2$ respectively;

b) a second portion to client $28_2$, namely stars $44_5$ and $44_6$ to client $28_2$ according to the contents of leaves $64_7$ and $64_8$ respectively; and c) a third portion to client $28_n$, namely stars $44_4$ and $44_7$ according to the contents of leaves $64_9$ and $64_{10}$ respectively.

In a present embodiment, such assignment of portions of the task is performed via an OGSA facility available in manager 24 and clients 28. Having so assigned portions of the task, each client 28 will utilize the data passed thereto at step 120 to determine the total acceleration on each of the respective stars 44 due to the other stars 44 in the galaxy 40 for the respective stars 44 that it was assigned to process in accordance with the Barnes-Hut operation. In other words, each client 28 is used to walk a respective portion of tree 60 in accordance with the Barnes-Hut operation.

Method 100 then advances to step 130, at which point the results generated by the clients are compiled. In a present embodiment, step 130 can be performed over a number substeps, indicated generally as method 130a in FIG. 7. Referring now to FIG. 7, at step 131 there is a wait-state to receive the results of assigned portions of the task. When using system 20, manager 24 will perform step 131, waiting for a particular client 28 to pass the results of that client 28's performance of the task that was assigned at step 120. The wait at step 131 can be based on various criteria, such as a simple time-delay, and/or it can be based on receipt of a message from a particular client 28 that a result is, or is not, going to be forthcoming from that particular client 28, and/or it can be based on receipt of a message from equipment that operates network 32 that indicates to manager 24 that a particular client 28 is no longer connected to network 32. Whatever the criteria used at step 131, when method 130a advances to step 132, a determination is made as to whether results were actually received from that particular client 28 for which manager 24 was waiting at step 131. If results were received at manager 24 from that particular client 28, then method 130a advances from step 132 to step 133, and those received results are included in the compilation of results. Thus, according to the specific example discussed above, where client $28_2$ completes its determination of the acceleration of stars $44_5$ and $44_6$ and returns those results to manager 24, then those results are included as part of the compilation of all results collected by manager 24.

However, if, at step 132, no results are actually received for a particular client 28, then the method advances to step 134 where an approximation is made of the results that were expected from that particular client. Such an approximation is typically made by manager 24. According to the specific example discussed above, where, for example, client $28_n$ fails to return the results of its determination of acceleration of stars $44_4$ and $44_7$, then manager 24 will use an approximation of that acceleration. During an initial cycling of method 100, such an approximation can be the same initial acceleration (or velocity, if desired) of stars $44_4$ and $44_7$ that was originally sent to client $28_n$ during the assignment of the portion of the overall task that was performed at step 120. Alternatively, method 100, and method 130a have successfully cycled more than once and during a previous cycle results (i.e. the acceleration of stars $44_4$ and $44_7$) were actually received from that client $28_n$, then the last-received acceleration results from client $28_n$ will form the approximation at step 134. Other means of having manager 24 perform the approximation will now occur to those of skill in the art. Method 130a then advances from step 134 to step 133, and the particular approximation generated at step 134 is used in the compilation of results performed at step 133.

Method 130a then advances to step 135, where a determination is made as to whether all clients have been accounted for. If all clients have not been accounted for, then method 130a advances to step 136, where the manager's attention is moved to the next client, and then the method 130a returns to step 131 to begin anew of that next client. If, at step 135, however, all clients have been accounted for, then the method advances to step 137 and all of the results are compiled. Thus, when step 137 is performed in relation to the determination of the movement of the stars 44 of galaxy 40, manager 24 will use the accelerations received, or approximated, in relation to tree 60 to determine the movements, and new locations, of stars 44 within galaxy 40.

Method 130a is thus completed, and by extension, step 130 is also thus completed, and so, referring again to FIG. 3, method 100 advances to step 140 and a determination is made as to whether the task is complete. In the specific example of determining the movement of stars 44 in galaxy 40, if further determinations are needed or desired to ascertain the movements of stars 44 in galaxy 40, then the method will return to step 110 so method 100 can begin anew. However, if no further determination is needed, or desired, then the task is complete and method 100 ends.

While only specific combinations of the various features and components of the present invention have been discussed herein, it will be apparent to those of skill in the art that desired subsets of the disclosed features and components and/or alternative combinations of these features and components can be utilized, as desired. For example, the steps of methods 100 and 130a need not be performed in the exact sequence, or format as shown.

Furthermore, it should be reiterated that system 20 and method 100 were described in relation to a simplified computing task of determining movements of stars within a two-dimensional galaxy. It should now be apparent that the teachings herein can be utilized to determine more general, and multi-dimensional, n-body type problems that can be described as having in common a determination of:

$$\frac{1}{r}$$

or, more generically, $$\frac{1}{r^x}$$

for a number of objects, where r is the distance between those objects, and x is any real number. In still more general terms, it is to be understood that the teachings herein can be applied to operations where relationships can be occasionally approximated with minimal, or otherwise acceptable, impact on the overall results. Such objects can be masses or charged particles, or any other type of object to which an n-body type problem is applicable.

It is also to be understood that the teachings herein can be applied to a variety of tasks, other than n-body type problems, that may share characteristics that are similar to n-body type problems. In general, the teachings herein can be used to handle computing tasks comprising repeatable operations that include a number of sub-operations, where those sub-operations can be applied a plurality times substantially independently of the other sub-operations. Examples of real-world tasks include determinations of: a) movements of masses in the universe or a given space; b) particle charges; c) electromagnetic fields in electronic circuits or other contexts; d) fluid dynamics in a fluid system; e) weather patterns; f) equity fluctuations in financial markets; and/or g) movements of objects in multi-player games. Other examples of tasks that can be performed using the teachings herein will occur to those of skill in the art.

A variety of enhancements to system 20, method 100 and method 130a are also contemplated and within the scope of the invention. For example, manager 24 can be configured to perform load balancing based on a pattern of failures or other experiences of waiting for client results at step 131. If, for example, manager 24 finds on a given cycling of method 130a that client $28_2$ returns results more quickly than client $28_1$, then manager 24 can elect during subsequent cycles of step 120 to assign a greater portion of the overall task to client $28_1$, and a smaller portion to client $28_2$, or to elect to stop using client $28_2$ altogether. More specifically, during a subsequent cycling of step 120, manager 24 can elect to assign:

a) stars $44_2$, $44_3$ and $44_1$ to client $28_2$;
b) stars $44_5$ and $44_6$ to client $28_1$; and
c) stars $44_4$ and $44_7$ to client $28_n$.

Such load-balancing can be performed on the fly, from cycle-to-cycle of method 100, as desired. Alternatively, where a given client 28 is effectively disconnected from network 32, then manager 24 can assign that portion to the remaining clients 28. For example, if client $28_n$ disconnected from network 32, then manager 24 can elect to assign portions of the task as follows:

a) stars $44_2$, $44_3$, $44_1$, $44_4$ and $44_7$ to client $28_2$; and,
b) stars $44_5$ and $44_6$ to client $28_1$.

Conversely, as new clients 28 join network 32, then manager 24 can further distribute task-portions amongst the full set of clients 28. In general, it should be understood that the number of leaves 64 need not correspond to the number of available clients 28. Additional types of load-balancing techniques will now occur to those of skill in the art.

As another enhancement, manager 24 can be provided with a metric that represents a threshold of a degree of error in the performance of its task that is acceptable or desirable. Thus, for example, where manager 24 has had to perform some predetermined, excessive number of approximations at step 134, then manager 24 can be operated to perform a series of catch-up cycles, wherein the failed task portions assigned to particular clients 28 for which approximations were made are actually reassigned to other clients 28, while further cycles are delayed until the approximations are substituted for correct results. Again, the point at which manager 24 institutes such corrective action can be based on any desired criteria, and the way such corrective action is implemented can be chosen. For example, where a given portion of a task is relatively straightforward, it can be desired to have manager 24 actually perform the task-portion itself, rather than assigning that portion to a client 28.

The aforementioned threshold of degree of error in the performance of the task can also be used to determine what kinds of tasks can be performed by system 20. System 20 can be particularly suitable where approximations are acceptable in performance of all or part of the task at hand.

Furthermore, while the task discussed in reference to galaxy 40 of FIG. 2 involves the assignment of all aspects of the task to each client 28, it should be understood that other types of tasks can include input from a particular client 28. For example, where manager 24 is coordinating a playing arena in a multi-player game, and each client 28 represents a participant in the game, then the task can include manager 24 assigning each client 28 the responsibility of determining where that participant is located in the arena, but such determination will also include user-input from the individual operating that particular client 28, as that individual selects where the participant is to move within the arena. Thus, where a client 28 momentarily "drops-out" of the game, manager 24 can approximate the movement of the participant until the client 28 rejoins. This type of variation can also be applicable to tasks involving weather determinations, as various clients 28 represent weather stations that contribute local weather condition data to the manager 24. This type of variation can also be applicable to tasks involving tracking pricing of products in financial markets, as each client 28 can represent a particular trading floor of that particular product, with manager 24 tracking an aggregate market-price for a particular product.

The above-described embodiments of the invention are intended to be examples of the present invention and alterations and modifications may be effected thereto, by those of skill in the art, without departing from the scope of the invention, which is defined solely by the claims appended hereto.

What is claimed is:

1. A manager for use in a system of grid computing comprising a processor implemented as hardware and programmatically structured to define a computing task based on data received by said processor, said processor further programmatically structured to assign a portion of said task to each of a plurality of clients connected to said manager via a network, each of said plurality of clients configured to produce a result by performing a computation using said portion, said processor further programmatically structured to approximate said result of performing said computation, where the step of approximating is at least one of: using the initial data that was passed to the failing node as the approximate result or using the last received previously cycled result from a failing node that has successfully cycled more than once as the approximate result, using said portion when said client fails to return said result to said manager, wherein said processor is configured to determine a client failure to return said results based upon at least one condition selected from a group of conditions consisting of: a receipt of a message indicating that the client is no longer connected to the network, a receipt of a message from the client indicating that said result is not forthcoming, and an expiration of a previously defined time delay for said client to provide said result.

2. The manager of claim 1, wherein said task is one of a plurality of repeatable operations, said task including a plurality of sub-operations, wherein one of said sub-operations is said portion for which said manager approximates the result, and wherein said approximation of said portion introduces a predefined accepted level of error to a performance of said task.

3. The manager according to claim 1, wherein said result is a result of a cycle of a multi-cycle computation, wherein an approximation of said result is based at least in part upon at least one previous result for the multi-cycle computation received from said client that failed to return said result.

4. The manager according to claim 1, wherein said task is an n-body type problem, and wherein a programmatic decision by the manager as to whether to approximate said result when said client fails to return it or whether to re-execute said task to generate said result is made based upon whether a computed degree of error computed for approximating said result exceeds a previously defined threshold for an acceptable degree of error during approximations.

5. The manager according to claim 4 wherein said n-body type problem is performed using the Barnes-Hut operation.

6. A system of grid computing comprising: a manager computing device programmatically structured to define a computing task and assign a portion of said task to each of a plurality of clients connected to said manager via a network, each of said plurality of clients configured to produce a result by performing a computation using said portion, said manager further programmatically structured to approximate said result of performing said computation, where the step of approximating is at least one of: using the initial data that was passed to the failing node as the approximate result or using the last received previously cycled result from a failing node that has successfully cycled more than once as the approximate result, using said portion if said client fails to return said result to said manager, wherein said manager is configured to determine a client failure to return said results based upon either a receipt of a message indicating that the client is no longer connected to the network, or an expiration of a previously defined time delay for said client to provide said result, wherein said manager is configured to approximate said result based at least in part upon at least one previous result received from said client that failed to return said result, and wherein said manager is configured to make a programmatic decision as to whether to approximate said result when said client fails to return it or whether to re-execute said task at said manager to generate said result based upon whether a computed degree of error computed for approximating said result exceeds a previously defined threshold for an acceptable degree of error during approximations.

7. A computer-readable storage medium comprising: a plurality of computing instructions for a manager connectable to a plurality of clients via a network, said computing instructions for defining a computing task and assigning a portion of said task to each of said clients, each of said plurality of clients configured to produce a result by performing a computation using said portion, said instructions including steps for approximating a result of said portion if said client fails to return said result to said manager, where the step of approximating is at least one of: using the initial data that was passed to the failing node as the approximate result or using the last received previously cycled result from a failing node that has successfully cycled more than once as the approximate result, and wherein computing instructions are configured to determine a client failure to return said results based upon either a receipt of a message indicating that the client is no longer connected to the network or an expiration of a previously defined time delay for said client to provide said result, wherein said computing instructions are configured to approximate said result based at least in part upon at least one previous result received from said client that failed to return said result, and wherein said computing instructions are configured to make a programmatic decision as to whether to approximate said result when said client fails to return it or whether to re-execute said task at said manager to generate said result based upon whether a computed degree of error computed for approximating said result exceeds a previously defined threshold for an acceptable degree of error during approximations.

8. The computer-readable medium of claim 7, wherein said task is one of a plurality of repeatable operations, said task including a plurality of sub-operations, wherein one of said sub-operations is said portion for which said manager approximates the result, and wherein said approximation of said portion introduces a predefined accepted level of error to a performance of said task.

9. The computer-readable storage medium of claim 8, wherein in absence of said manager approximating the result, said task would situationally have to be restarted and all of said sub-operations performed by said plurality of clients repeated.

10. The computer-readable storage medium of claim 8, wherein said task is an n-body type problem.

11. The computer-readable storage medium of claim 10, wherein said n-body type problem is performed using the Barnes-Hut operation.

12. The computer readable storage medium of claim 7, wherein said task is selected from the group consisting of determining a) movements of masses in a given space; b) charges of particles; c) electromagnetic fields; d) fluid dynamics in a fluid system; e) weather patterns; I) equity fluctuations in financial markets; and g) movements of objects in multi-player games.

13. A method for grid computing, comprising: dividing a computing task into a plurality of portions, wherein the computing task relates to an n-body type problem concerning a plurality of bodies, each portion relates to not more than one body of the plurality of bodies and comprises data corresponding to the body; assigning the plurality of portion to a plurality of clients, wherein at least one portion is assigned to each of the plurality of clients, each of the plurality of clients connected to a network; processing the plurality of portions at the plurality of clients, wherein each client of the plurality of clients is configured to compute a result of the body for each portion assigned to the client based upon the data corresponding to the body; compiling results computed by the plurality of clients for each of the plurality of portions; repeating the dividing, assigning, processing, and compiling in iterative cycles until the computing task is finished; while repeating, failing to receive results from at least one client of the plurality of clients; in response to failing to receive results from the at least one client, approximating the results that were not received, where the step of approximating is at least one of: using the initial data that was passed to the failing node as the approximate result or using the last received previously cycled result from a failing node that has successfully cycled more than once as the approximate result.

14. The method of claim 13, wherein assigning the plurality of portions comprising assigning multiple of the plurality of portions to at least one client of the plurality of clients.

15. The method of claim 13, wherein the dividing and assigning are performed by a manager, in response to failing to receive results from the at least one client, alternatively computing the results at the manager for a present cycle.

16. The method of claim 13, wherein failing to receive results is determined by either receiving a message from equipment which operates the network that the client is no longer connected to the network or an expiration of a previously defined time delay for the client to provide the result.

17. The method of claim 13, wherein upon a client failing to return results over a predefined number of cycles, reassigning the at least one portion assigned to the client to at least one other client.

* * * * *